United States Patent [19]

Kazami et al.

[11] 4,188,616
[45] Feb. 12, 1980

[54] METHOD AND SYSTEM FOR TRANSMITTING AND RECEIVING BLOCKS OF ENCODED DATA WORDS TO MINIMIZE ERROR DISTORTION IN THE RECOVERY OF SAID DATA WORDS

[75] Inventors: Shin-Ichi Kazami, Tokyo; Toshitada Doi, Yokohama, both of Japan

[73] Assignee: Sony Corporation, Tokyo, Japan

[21] Appl. No.: 905,894

[22] Filed: May 15, 1978

[30] Foreign Application Priority Data

May 16, 1977 [JP] Japan .................................. 52-56142

[51] Int. Cl.² .................... G06F 11/10; G06F 11/12
[52] U.S. Cl. ........................................... 340/146.1 AL
[58] Field of Search ............................... 340/146.1 AL

[56] References Cited

U.S. PATENT DOCUMENTS

| | | | |
|---|---|---|---|
| 3,571,794 | 3/1971 | Tong | 340/146.1 AL |
| 3,657,699 | 4/1972 | Rocher et al. | 340/146.1 A |
| 3,771,126 | 11/1973 | Apple, Jr. | 340/146.1 AL |
| 3,775,746 | 11/1973 | Boudreau et al. | 340/146.1 AL |
| 3,831,143 | 8/1974 | Trafton | 340/146.1 AL |
| 4,052,698 | 10/1977 | Ragle | 340/146.1 AL |

*Primary Examiner*—David H. Malzahn
*Attorney, Agent, or Firm*—Lewis H. Eslinger; Alvin Sinderbrand

[57] ABSTRACT

A plurality l of data blocks, each comprised of at least two data words and a parity word associated bit for bit with the data words, together with an error correcting code word associated with each data and parity word, are transmitted in interleaved relation. L data words and associated error correcting code words followed by l parity words and associated error correcting code words and followed by l data words and associated error correcting code words, all transmitted in seriatim, are received and stored, and each error correcting word is decoded to ascertain the presence of an error in each received data or parity word. All of the data words and the parity word in a block are read out simultaneously, together with an indication of the presence of errors in any of the read out data and parity words; and in the event of an error, an erroneous data word is corrected in accordance with the parity word in that block; and if parity correction cannot be achieved, an erroneous data word is replaced by the average of the data word in the preceding and next following data block. In a preferred application, each data word is formed of a plurality of multi-bit samples of, for example, interleaved left channel and right channel audio signals. The overall length of l data words and associated error correcting words plus l parity words and associated error correcting words is greater than the longest expected error length, such as a burst error.

42 Claims, 16 Drawing Figures

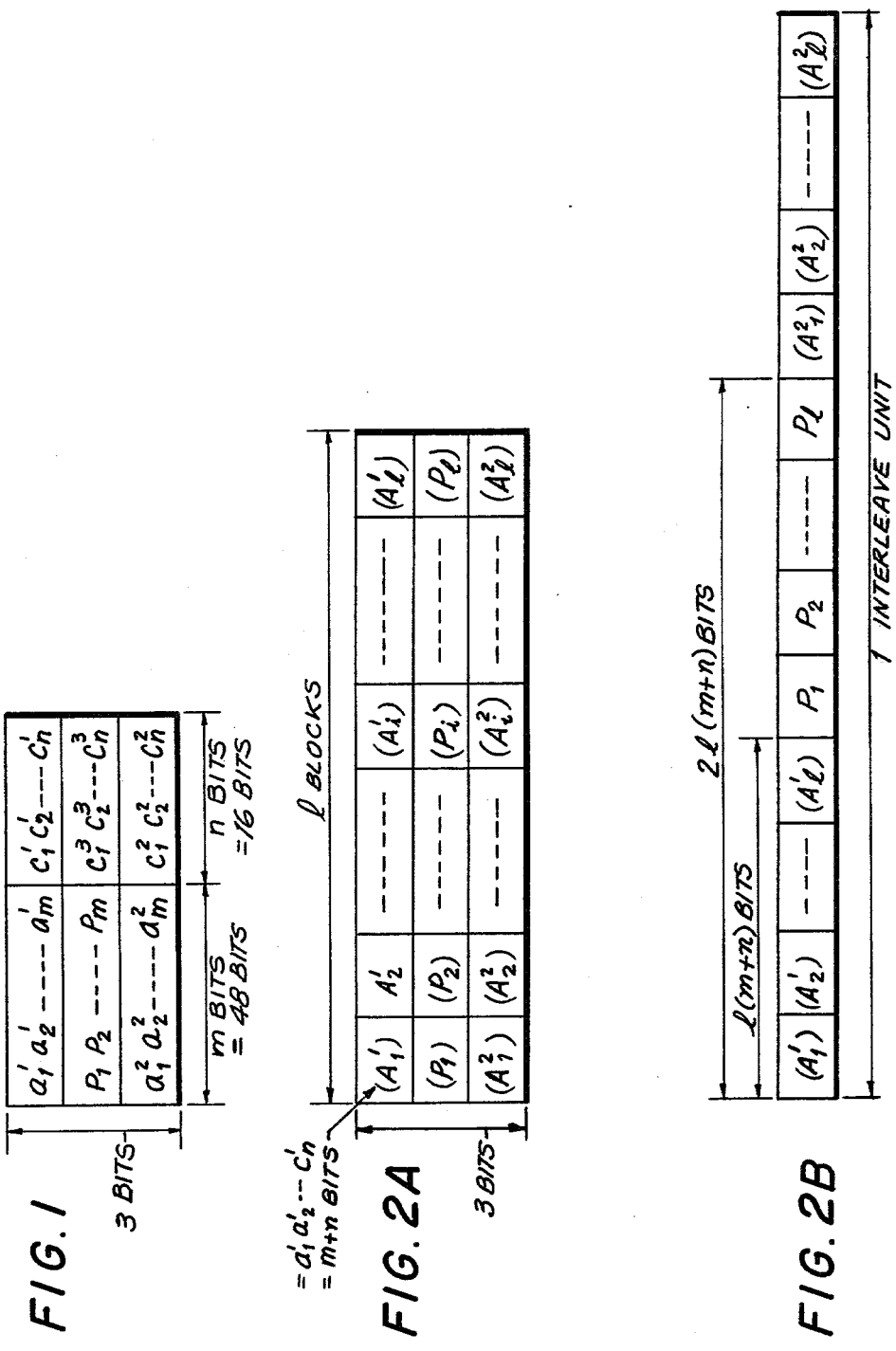

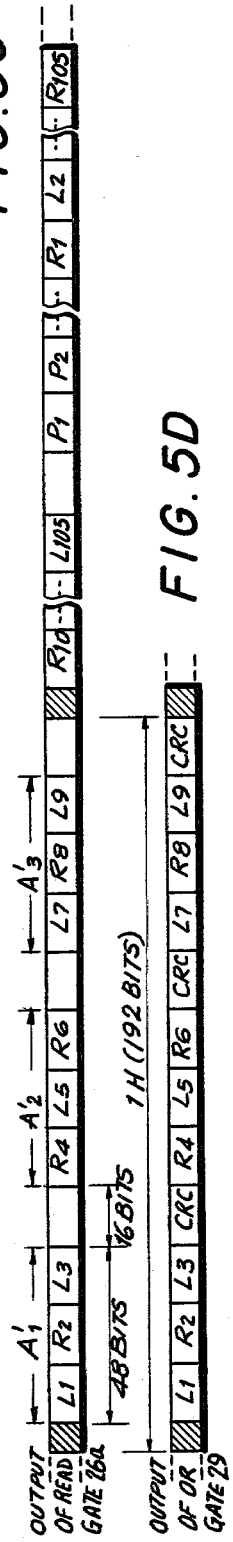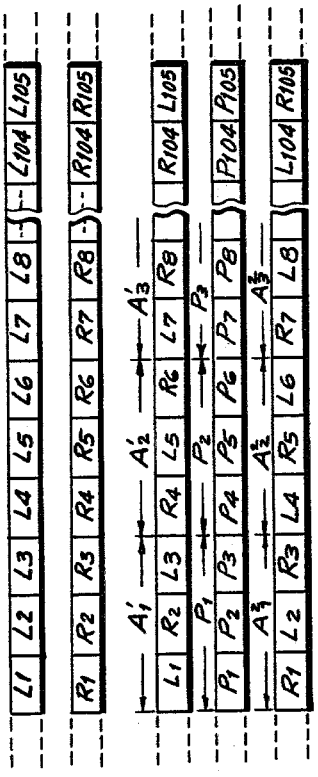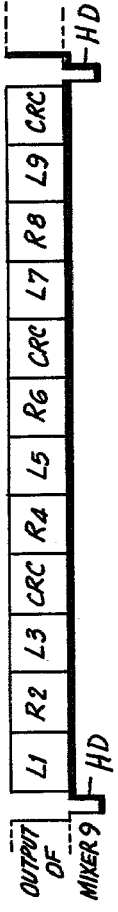

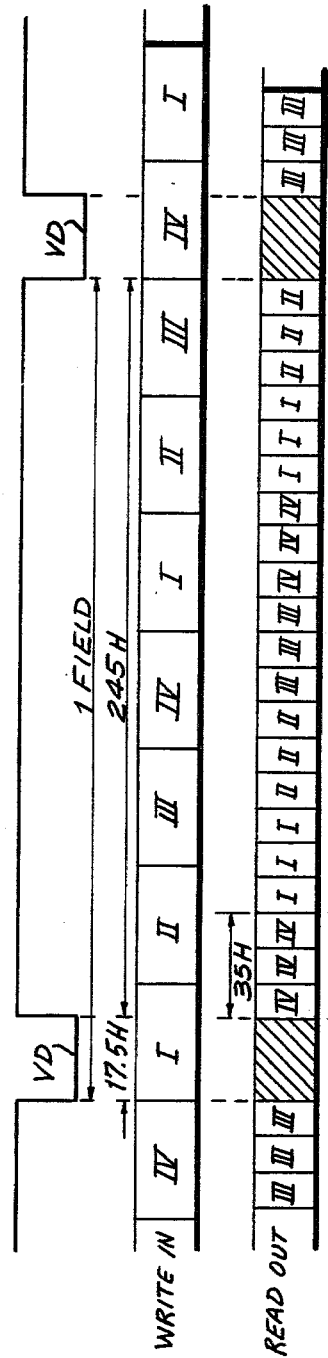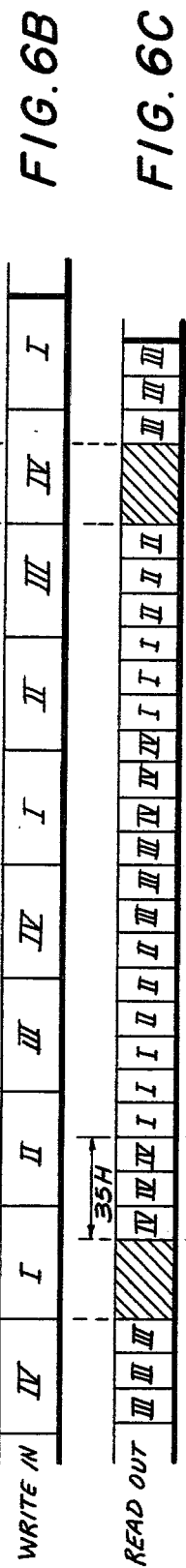

METHOD AND SYSTEM FOR TRANSMITTING AND RECEIVING BLOCKS OF ENCODED DATA WORDS TO MINIMIZE ERROR DISTORTION IN THE RECOVERY OF SAID DATA WORDS

BACKGROUND OF THE INVENTION

This invention relates to methods and systems for transmitting and receiving encoded data words and, more particularly, to a technique wherein intelligible information can be reproduced from such encoded data words even in the presence of an error condition which otherwise would distort or destroy the encoded information. A particular application of the present invention is to utilize digitally encoded data words, such as PCM data, for the recording of audio information on a video signal recording medium.

The recording of analog signals in the form of digitally encoded data is known. For example, in copending application Ser. No. 771,350, filed Feb. 23, 1977, now U.S. Pat. No. 4,138,694, and assigned to the assignee of the present invention, a technique is described wherein left and right channel audio signals are sampled and encoded in, for example, PCM form, and these PCM signals are recorded on video tape by a conventional video tape recorder (VTR). Since digital signals are recorded, this technique is susceptible to the inherent problem of drop-out wherein one or more bits of a data word or character may be distorted or obliterated because of microscopic defects in the magnetic tape or in the recording or playback operation. While such drop-out is relatively insignificant if it affects a bit of lesser significance, the reproduced data word can be seriously misrepresented or distorted if the drop-out affects a more significant bit. This problem is particularly noticeable if drop-out is present for a number of data words.

Data distortion or destruction due to drop-out also is found in the transmission of digital data over a communication channel, such as by radio communication, wire communication and the like. Another phenomenon which affects both digitial communication as well as digital recording and reproduction is the presence of an extended error which may exist over a significant number of data words or characters. This error, referred to herein as a burst error, may distort or destroy a relatively large number of data words. As a consequence thereof, the data which was represented by such data words cannot be recovered. If the digital data is intended to represent audio information, such as left and right channel stereo information, this burst error results in serious distortion of such stereo information. When the distorted digital signals are reproduced as audio signals, the distortion in sound is particularly noticeable, and undesirable "clicks" generally are reproduced.

The problem of drop-out which may affect only a single bit in a data word can be minimized by providing a parity bit for that word. For example, for odd parity, if the total number of binary 1's in a data word is odd, then the parity bit may be a binary 0. Conversely, if the total number of binary 1's in the data word is even, then the parity bit may be a binary 1. Analogously, a suitable parity bit may be provided for even parity. Of course, this simple expedient of a parity bit will not account for the drop-out of a plurality of data bits, nor will the parity bit be capable of compensating for burst errors.

To account for the problem of multiple bit drop-out and the problem of burst error in the communication of digital words or characters, various error correcting codes have been developed. For example, a data character may be constituted by a plurality of information bits which constitute a data word followed by a plurality of error correcting bits which may constitute an error correcting word. When this character is received, the error correcting code is decoded and used to determine whether the bits of the data word are in agreement with the error correcting word. That is, the data word is checked to determine if it is an allowable word with which the error correcting word is associated. If an error is detected, suitable steps may be taken for correction, such as re-transmission of the character. In accordance with another technique, error correction is attained by modifying the data word in an attempt to correct it so that it agrees with the received error correcting word. This correction is carried out on the basis of the pattern of disagreements of data words with their associated error correcting words.

Unfortunately, the typical use of an error correcting code word in association with a data word may not be capable of detecting or correcting burst errors of significant length. For example, if a data word is formed of m bits and the error correcting word is formed of n bits, then a burst error which exceeds some predetermined fraction of n might not be detected or corrected. If the burst error extends over some number 1 of characters, then 1 data words cannot be faithfully reproduced, and the information represented thereby is lost. When the data words represent audio information, such as stereo signals, this lost information substantially distorts the audio signals which ultimately are reproduced.

OBJECTS OF THE INVENTION

Therefore, it is an object of the present invention to provide an improved technique for transmitting and receiving encoded data words which avoids the aforenoted problems and disadvantages, particularly with respect to the problems of drop-out and burst errors.

Another object of this invention is to provide an improved technique for encoding data words which is particularly advantageous for recording on and reproducing from a video signal recording medium, such as magnetic tape in a video tape recorder.

A further object of this invention is to provide a method and system for transmitting a plurality of data words in the form of interleaved data blocks wherein each data block is formed of a plurality of data words and at least one parity word, and wherein the data blocks are interleaved by transmitting a first data word from each block followed by a parity word in each block followed by another data word in each block, each data and parity word being transmitted with an associated error correcting word, all in seriatim.

Another object is to provide the overall length of a set of data words and a set of parity words equal to or greater than the longest burst error which can be expected.

Yet another object of this invention is to provide a method and system for receiving encoded data blocks which are transmitted in interleaved fashion wherein serially transmitted first data words in each data block are stored in one storage location, serially transmitted parity words in each data block are stored in another storage location and serially transmitted second data words in each data block are stored in a further storage location, one data word from each storage location being read out simultaneously so as to reconstruct each data block in seriatim.

A still further object of this invention is to provide a technique for transmitting encoded data words wherein the time axis of such data words is compressed so as to form gaps into which associated error correcting words are transmitted, and a technique for receiving such data words wherein the associated error correcting words are removed and the time axis of the received data words is expanded so as to fill in the previously formed gaps.

Another object of this invention is to provide a method and system for transmitting the receiving encoded data words, together with associated error correcting words, whereby drop-out and burst errors can be compensated so as to reproduce intelligible information even if a burst error extends over a multiple of data words.

Various other objects, advantages and features of the present invention will become readily apparent from the ensuing detailed description, and the novel features will be particularly pointed out in the appended claims.

SUMMARY OF THE INVENTION

In accordance with the present invention, a method and system are provided for transmitting encoded data words, each data word being formed of a multiple of bits, and a plurality of data words, together with a parity word, constitute a data block. Each data and parity word is associated with an error correcting word. A predetermined number of blocks is interleaved for transmission, the interleaved blocks being comprised of serially transmitted first data words and associated error correcting words for each block followed by serially transmitted parity words and associated error correcting words for each block, followed by serially transmitted second data words and associated error correcting words for each block. Each bit in a parity word in a block relates to corresponding bits in at least two data words in that block.

Further in accordance with the present invention, a method and system of receiving the above-mentioned interleaved data blocks are provided wherein each error correcting word is detected, and the serially received first data words in the predetermined number of data blocks are stored in a first storage location, the serially received parity words are stored in another storage location and the serially received second data words are stored in a further storage location. A word in each storage location is read out simultaneously so as to reconstruct the original data block. Depending upon error indications provided by the detection of the error correcting words, an erroneous data word in a block is corrected.

A preferred application of the present invention is the recording and reproduction of audio signals, such as left channel and right channel stereo signals, in digital form on a video signal recording medium, such as a magnetic tape of a video tape recorder.

BRIEF DESCRIPTION OF THE DRAWINGS

The following detailed description, given by way of example, will best be understood in conjunction with the accompanying drawings in which:

FIG. 1 is a diagrammatic representation of a data block arranged in accordance with the present invention;

FIGS. 2A and 2B are diagrammatic representations of the arrangements of a plurality of data blocks and the manner in which such data blocks are interleaved for transmission, in accordance with the present invention;

FIGS. 5A–5G are diagrammatic representations of the manner in which the encoder shown in FIG. 4 transmits interleaved data blocks and the manner in which such interleaved data blocks are received and reconstructed;

FIGS. 6A–6C are useful in understanding the manner in which the encoder shown in FIG. 4 generates encoded data which is compatible with a VTR.

DETAILED DESCRIPTION OF A CERTAIN PREFERRED EMBODIMENT

Figure 3:
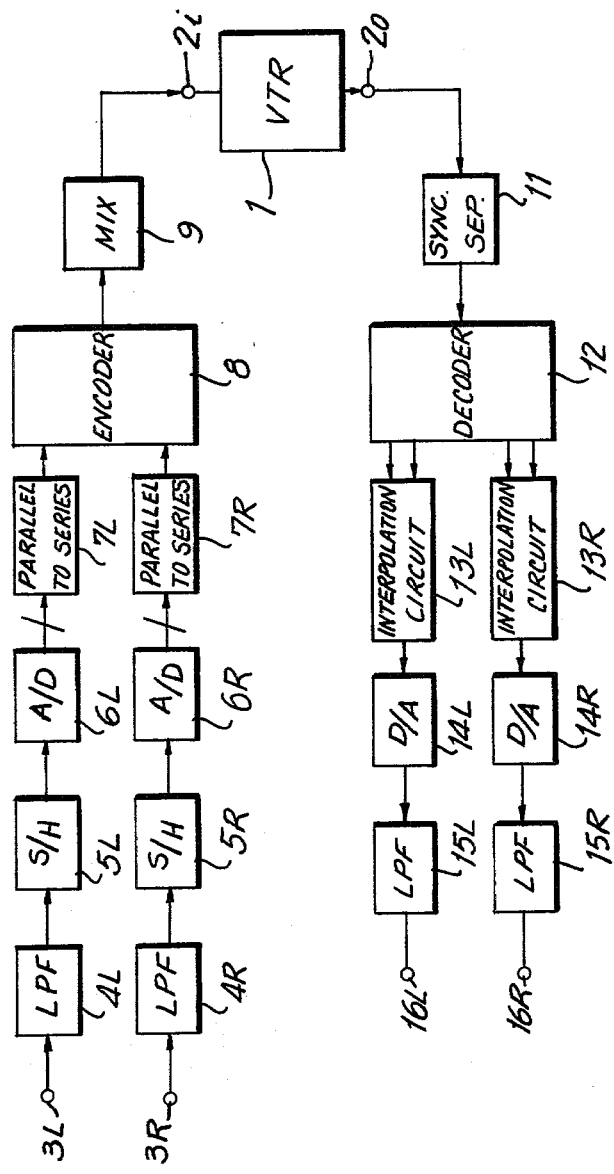
FIG. 3 is a block diagram of one application of the present invention.

Referring now to the drawings, and particularly in FIG. 1 thereof, there is illustrated an example of the arrangement of a data block which is formed as a matrix array of rows and columns. In the illustrated example, the data block is formed of three rows and m+n columns. A bit is provided in each column. Each row is formed of one or more words comprised of m bits and an associated error correcting word comprised of n bits. It is preferred that the data block be formed of three rows; but the teachings of the present invention are applicable to more than three rows, as will be appreciated. In FIG. 1, each letter refers to a bit, and the superscript identifies the row while the subscript identifies the column for that bit. Thus, the first row of data bits is constituted by $a^1_1, a^1_2 \ldots a^1_m$. Associated with this data word of m bits is the error correcting word formed of bits $c^1_1, c^1_2 \ldots c^1_n$. As an example, the m bits forming the data word are m=48; while the n bits forming the error correcting word are n=16. Another row of data bits is constituted by $a^2_1 a^2_2 \ldots a^2_m$, forming a second data word. Associated with this second data word is an error correcting word constituted by bits $c^2_1 c^2_2 \ldots c^2_n$. The rows of data words are separated by a parity word which is formed of a row of parity bits $p_1 p_2 \ldots p_m$. Associated with the parity bits is the error correcting word constituted by bits $c^3_1 c^3_2 \ldots c^3_n$. In accordance with a feature of the present invention, two data words which are constituted by respective rows of data bits are separated from each other by a parity word which is formed of a row of parity bits. It is appreciated that bits a are information bits, bits c are in accordance with an error correcting code, such as a CRC code, a parity check code, and the like, and bits p are parity bits.

Each parity bit in a column is determined by the data bits in that column. For example, parity bit $p_1$ is determined by the exclusive-OR combination (or inverse of the exclusive-OR combination) of data bits $a^1_1$ and $a^2_1$. Similarly, parity bit $p_2$ is determined by the exclusive-OR combination (or inverse exclusive-OR combination) of data bits $a^1_2$ and $a^2_2$. The remaining parity bits are determined in the same manner.

The error correcting word in each row is determined by conventional error correcting coding techniques such that each error correcting word is associated with the data or parity word in that row. Since error correcting coding techniques are known to those of ordinary skill in the art, further description thereof is not provided. Suffice it to say that each data word or parity word can be corrected in the event of drop-out or small burst error in accordance with its associated error correcting word.

Let it be assumed that each row of bits which comprises a data word and an error correcting word in a data block represents a character or word. If this word is formed of data bits, such as the data bits in row 1, then the word is represented as A. If the word is comprised of parity bits, such as the parity bits in row 2, then this word is represented as P. Using a matrix array similar to that shown in FIG. 1, a plurality of data blocks can be formed as shown in FIG. 2A. Thus, block 1 is formed of data word $A^1_1$, parity word $P_1$ and data word $A^2_1$, wherein each word is assumed herein to comprise a plurality of data or parity bits together with error correcting bits. Accordingly, data word $A^1_1$ corresponds to the first row of bits shown in FIG. 1 and is formed of $a^1_1 a^1_2 \ldots a^1_m c^1_1 \ldots c^1_n$. A similar arrangement constitutes parity word $P_1$ and data word $A^2_1$.

Block 2 is formed of three rows of bits, the first row being represented as data word $A^1_2$, the second row being represented as parity word $P_2$ and the third row being represented as data word $A^2_2$. Similar arrangements constitutes the remaining blocks such that the i-th block is formed of a row of data and error correcting bits to constitute data word $A^1_i$, a row of parity and error correcting bits represented as parity word $P_i$ and a row of data and error correcting bits represented as data word $A^2_i$. The last, or l-th block also is formed of data word $A^1_l$, parity word $P_l$ and data word $A^2_l$. Here too, each word is formed of a row of bits and the block includes columns of bits, all similar to the representation shown in FIG. 1.

In accordance with the present invention, the l blocks shown in FIG. 2A are transmitted in interleaved relationship as illustrated in FIG. 2B. Accordingly, all of the first rows of data words $A^1$ in each of the l data blocks are transmitted in seriatim, followed by all of the parity words P in each of the l data blocks, also in seriatim, followed by all of the further row of data words $A^2$ in each of the l data blocks, also in seriatim. That is, the first rows in all l blocks are transmitted as $A^1_1 A^1_2 \ldots A^1_l$. Then, all of the second rows of the l blocks are transmitted as $P_1 P_2 \ldots P_l$. Finally, all of the third rows of the l blocks are transmitted as $A^2_1 A^2_2 \ldots A^2_l$. Since each row or word $A^1$ or P or $A^2$ in a block is formed of m+n bits, as described in FIG. 1, the number of bits which are transmitted serially for all of the first row of data words in the l data blocks is equal to l(m+n); the number of data bits which are transmitted serially for each row P of the l data blocks also is equal to l(m+n); and the number of bits which are transmitted in all of the third rows of the l data blocks also is equal to l(m+n). The interleaved data blocks may be thought of as interleaved rows of bits with the total number of transmitted bits equal to 3×l(m+n). Stated otherwise, the interleaved data blocks are transmitted in separate sections or sets of successive data or parity words, each data or parity word being associated with an error correcting word, as depicted in FIG. 1.

It may be appreciated that, by reason of the parity words, the drop-out of any bit in a data word $A^1$ or $A^2$ can be corrected in accordance with the corresponding parity bit. Furthermore, each error correcting code word that is associated with a data or parity word can be used to correct that data or parity word in the event of an extended drop-out. Still further, and as will be described in greater detail below, in the event of a burst error of the type which prevents the correction of a data or parity word in accordance with its associated error correcting code word, the erroneous word is replaced by the average of the preceding and next following data or parity word in a data block. As an alternative, if a number of data or parity words are distorted by burst error, then an analogous interpolation operation can be carried out to replace the distorted words. It is appreciated that, in accordance with the interleaved relationship shown in FIG. 2B, no two consecutive words in a data block are transmitted in succession. Furthermore, two consecutive data words in a data block (such as $A^1_i$ and $A^2_i$) are separated from each other by 2×l(m+n) bits. This means that if the longest burst error which can be expected is no longer than 2×l(m+n) bits, then such a burst error will distort only a single data word in all of the data blocks. This means that even if one data word in a data block is distorted, the preceding data word in that block and the next succeeding data word in that block will not be distorted and, therefore, the distorted word can be replaced by an averaged or interpolated word. If the information represented by each data block is of a relatively slowly varying nature, then this averaging or interpolating technique will avoid serious distortion in the ultimately reproduced information. As an example, this information may be audio information, and the illustrated interleaved data blocks may be transmitted to a receiver or recorded on and then reproduced from a recording medium. Burst error in the transmission path or in the recording medium thus will not significantly distort the recovered audio information when the interleaved relationship shown in FIG. 2B is employed.

The data words A, the parity words P and the error correcting code words C may be expressed as polynomials as follows:

$$A(x) = a_1 x^{m-1} + a_2 x^{m-2} + \ldots + a_m \quad (1)$$

$$P(x) = p_1 x^{m-1} + p_2 x^{m-2} + \ldots + p_m \quad (2)$$

$$C(x) = c_1 x^{n-1} + c_2 x^{n-2} + \ldots + c_n \quad (3)$$

Each parity bit $p_i$ may be expressed as:

$$p_i = a^1_i \oplus a^2_i \text{ or } p_i = \overline{a^1_i \oplus a^2_i} \quad (4)$$

The error correcting code words are assumed to be CRC codes wherein error correcting code word $C^1$ is associated with data word $A^1$, error correcting code word $C^2$ is associated with data word $A^2$, and error correcting code word $C^3$ is associated with parity word P. Thus, in each data block, the respective CRC code words are determined as follows:

$$C^1(x) = x^n \cdot A^1(x) + Q^1(x) \cdot G(x) \quad (5)$$

$$C^2(x) = x^n \cdot A^2(x) + Q^2(x) \cdot G(x) \quad (6)$$

$$C^3(x) = x^n \cdot P(x) + Q^3(x) \cdot G(x) \quad (7)$$

where $$G(x) = g_0 x_n{}^n + g_1 x^{n-1} + \ldots + G_n \quad (8)$$

The expression G(x) is a generator polynomial, and the expression Q(x) is the quotient of $x^n A(x)$ divided by $x^n P(x)$.

The respective data word, parity word and error correcting code word expressiions are, of course, transmitted as serial codes in the block-interleaved relationship shown in FIG. 2B.

Turning now to FIG. 3, there is illustrated a block diagram of a signal recording system in which the present invention is readily utilized. For the purpose of the following description, it is assumed that each data block of the type shown in FIGS. 2A and 2B represents audio information and, particularly, left (L) and right (R) channel stereo signals. This digitally encoded audio information is recorded on a video signal recording apparatus, such as a conventional VTR. It is recognized that, in order to record digital signals on a VTR, typical horizontal and vertical synchronizing signals must be added to the digital signals so that the resultant digital signals are compatible with the VTR. The apparatus shown in FIG. 3 is adapted to add such video sychronizing signals to the encoded digital data.

In FIG. 3, VTR 1 is provided with an input terminal 2i and with an output terminal 2o through which encoded audio information is supplied for recording and from which the recorded, encoded audio information is reproduced, respectively. As mentioned above, the audio information is assumed herein to comprise left channel and right channel stereo signals, these signals being supplied to respective input terminals 3L and 3R. The left channel input terminal 3L is connected to input terminal 2i of VTR 1 via a processing channel comprised of a low pass filter 4L, a sample-and-hold circuit 5L, an analog-to-digital converter (A/D converter) 6L, a parallel-to-serial converter 7L, an encoder 8 and a mixing circuit 9. A similar processing channel connects the right channel input terminal 3R with input terminal 2i of VTR 1. As shown in FIG. 3, encoder 8 is common to the left and right processing channels, and as will be described below with respect to FIG. 4, the encoder transmits a serial bit stream of the type shown in FIG. 2B.

Output terminal 2o of VTR 1 is connected to a pair of left channel and right channel output terminals 16L and 16R, respectively, via left and right processing channels. In particular, the left processing channel is comprised of a synchronizing signal separator circuit 11, a decoder 12, an interpolation or averaging circuit 13L, a digital-to-analog converter (D/A converter) 14L and a low pass filter 15L. The right processing channel is similar in construction, and also includes synchronizing signal separator circuit 11 and decoder 12.

In operation, the left channel and right channel stereo signals are supplied to input terminals 3L and 3R, respectively. These stereo signals are filtered by low pass filters 4L and 4R so as to remove higher frequency components. The filtered stereo signals then are sampled in sample-and-hold circuits 5L and 5R. As a result of the conventional sampling operation, successive left channel and right channel samples are supplied to A/D converters 6L and 6R. Each A/D converter is operative to encode the sample supplied thereto into a 16-bit word or character, this word or character being produced in parallel form. Thus, A/D converter 6L provides a 16-bit word for each audio signal sample in the left channel and A/D converter 6R provides a 16-bit word for each audio sample in the right channel.

The parallel-bit words provided by A/D converters 6L and 6R are applied to parallel-to-serial converters 7L and 7R, respectively, for conversion from parallel form to serial form. Thus, each encoded left-channel sample and each encoded right-channel sample is supplied in serial-by-bit fashion to encoder 8.

Figure 4:
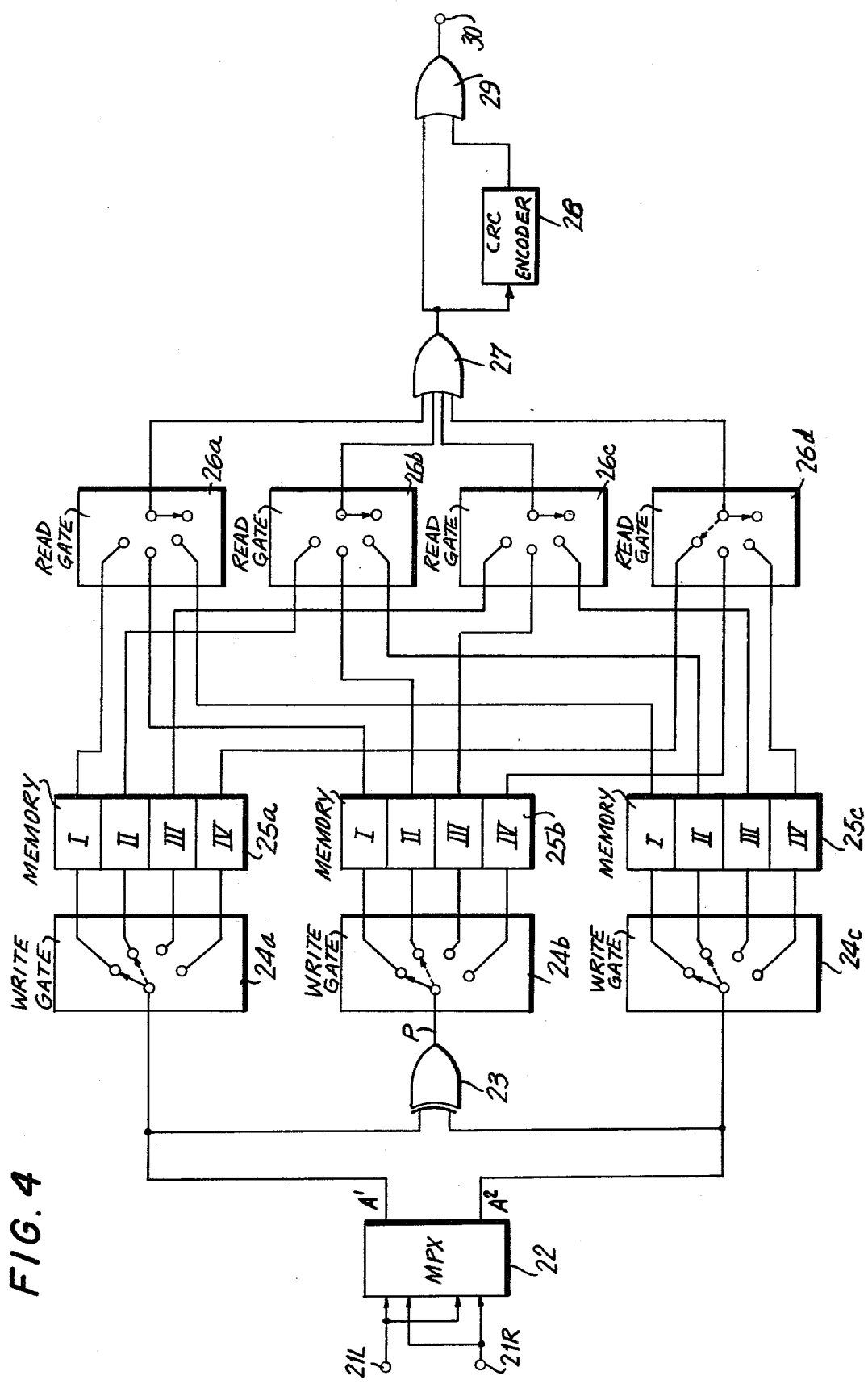
FIG. 4 is a block diagram of an encoder in accordance with the present invention.

The encoder is described in greater detail with respect to FIG. 4. The function of this encoder is to generate parity bits as a function of the left-channel and right-channel words supplied thereto, to generate error correcting code words as a function of these left-channel and right-channel words, to arrange respective data blocks from these left-channel and right-channel words, parity words and error correcting code words, and to interleave a number of such data blocks in the configuration shown in FIG. 2B. In addition, encoder 8 compresses the time axis of the serially-transmitted bits so as to form gaps between successive groups of words. These gaps are used for the insertion of horizontal and vertical synchronizing signals.

The output from encoder 8 is supplied to mixing circuit 9, the latter also being supplied with the aforementioned horizontal and vertical synchronizing signals, as well as equalizing pulses. These various synchronizing signals are generated by conventional circuitry (not shown), and such synchronizing signals are inserted into the gaps which are formed between respective groups of words by encoder 8. The output of mixing circuit 9 thus appears as a series stream of words, which constitute interleaved data blocks, this series stream including horizontal and vertical sychronizing signals by which VTR 1 operates properly. This series bit stream and synchronizing signals is recorded on magnetic tape by, for example, dual rotating heads in VTR 1.

During reproduction, the signals which had been recorded on video tape are reproduced therefrom serially-by-bit in block-interleaved format, such as shown in FIG. 2B. These reproduced signals are supplied from VTR output terminal 2o to synchronizing signal separator circuit 11 whereat the horizontal and vertical synchronizing signals which had been inserted into the serial bit stream by mixing circuit 9 now are removed therefrom. As a result of this removal, gaps remain between successive groups of words. These words and gaps are supplied to decoder 12.

The decoder is described in greater detail below with respect to FIG. 7. The function of the decoder is to rearrange the received interleaved data blocks into the matrix array shown in FIG. 2A. In addition, decoder 12 detects the presence of errors in the respective data words in accordance with the parity words and the associated error correcting code words. Parity errors are corrected and, where possible, erroneous data words are corrected by reason of the associated error correcting code word. Decoder 12 also is operative to supply left-channel and right-channel words to interpolation circuits 13L and 13R, respectively. Error indications also are supplied to these interpolation circuits in the event that the supplied left- and right-channel words are erroneous. These error indications represent that the left-channel and/or right-channel words which then are supplied to the interpolation circuits cannot be corrected merely by a parity correction operation, or in accordance with the error correcting code word. As an example, such error indications are produced when an extended burst error distorts or destroys more than one set or section of the interleaved data blocks.

In addition, decoder 12 expands the time axis of the decoded data words so as to fill in the gaps which had been formed by the removal of the synchronizing signals. As will also be described below, each associated error correcting code word is removed from the serial bit stream, and the resultant gap or space formed thereby likewise is filled in by this time axis expansion.

Interpolation circuits 13L and 13R are operative to replace an erroneous left-channel and/or right-channel word with the average or interpolated version of the preceding and next-following correct word. These interpolation circuits function only when decoder 12 supplies an error indication thereto representing that parity or code correction is not possible.

The left-channel and right-channel words provided at the outputs of interpolation circuits 13L and 13R, that is, the corrected words, are converted to respective analog signals by D/A converters 14L and 14R, and these analog signals are smoothed by low pass filters 15L and 15R, respectively. Hence, recovered left-channel and right-channel stereo signals are produced at output terminals 16L and 16R.

Referring to FIG. 4, there is illustrated therein a block diagram of encoder 8. The encoder is comprised of a multiplexer 22, write gates 24a, 24b and 24c, memory storage devices 25a, 25b and 25c, read gates 26a, 26b, 26c and 26d, an error correcting encoder 28 and an output OR gate 29. Multiplexer 22 is provided with left-channel and right-channel inputs 21L and 21R, respectively. A left-channel word is supplied serially to multiplexer 22 via input 21L, and a right-channel word is supplied serially to the multiplexer by input 21R. The multiplexer includes first and second outputs to which the supplied left-channel and right-channel words are transmitted in interleaved relation. That is, multiplexer 22 is adapted to apply alternate left-channel and right-channel data words to one output thereof and to apply alternate right-channel and left-channel words to the other output thereof. As an example, at one output, odd samples of the left-channel signal alternate with even samples of the right-channel signal; and at the other output, odd samples of the right-channel signal alternate with even samples of the left-channel signal. Each sample is formed of, for example, sixteen bits. A suitable clock generator (not shown) supplies switching pulses to the multiplexer for the purpose of achieving this alternate transmission of left-channel and right-channel words.

One output of multiplexer 22 is coupled to write gates 24a and the other output of the multiplexer is coupled to write gates 24c. In addition, these outputs of the multiplexer are coupled to an exclusive-OR gate 23, this exclusive-OR gate being provided for the purpose of generating a parity bit for each pair of information bits supplied thereto. The output of exclusive-OR gate 23 is coupled to write gates 24b. Typically, write gates 24a-24c are formed of logical gate circuts to which suitable gating control pulses are supplied, these control pulses being derived from a clock generator, or timing circuit (not shown). All of the write gates are adapted to operate simultaneously to steer a predetermined number of alternating left-channel and right-channel words, and an equal number of parity words into respective storage locations, or compartments of memory devices 25a–25c, respectively. To schematically represent this function of the write gates, these gates are depicted as switching circuits, each having a movable contact that can selectively engage any one of a plurality of fixed contacts.

Memory devices 25a, 25b and 25c are of similar construction and, for example, may be random access memories (RAM's). Each word which is supplied to a memory device by its associated write gates is stored in an addressable location, this location being selected by a suitable address generator (not shown) which is incremented in synchronism with the left-channel and right-channel words provided by multiplexer 22. Each storage location, or compartment, of memory device 25a, 25b and 25c is adapted to store a predetermined number of words. As an example, each storage location will store 1 words.

Memory devices 25a, 25b and 25c each are comprised of a plurality of storage locations. In FIG. 4, these storage locations are identified as locations I, II, III and IV. Each storage location is connected to a respective contact of the write gates 24a, 24b, 24c associated with memory devices 25a, 25b and 25c, respectively. When a storage location is filled, that is, when 1 words are written therein, the write gates select the next following storage location into which the next set or section of 1 words is written. Write gates 24a–24c are operative to write successive words into memory devices 25–25c, respectively, simultaneously. That is, write gates 24a will write words (serial-by-bit) into storage location I of memory device 25a simultaneously with the writing in of words by write gates 24b into storage location I of memory device 25b simultaneously with the writing in of words by write gates 24c into storage location I of memory device 25c.

Read gates 26a–26d are operative in sequence to read out the words which are stored in associated storage locations in memory devices 25a–25c. Although the read gates are constructed as logical gating circuits, they are depicted herein as switching circuits having a movable contact selectively engageable with any one of a plurality of fixed contacts. As an example, read gates 26a are provided with three fixed contacts, each being connected to storage location I of a respective memory device 25a, 25b and 25c. Similarly, read gates 26b include fixed contacts which are connected to storage location II in each of respective memory devices 25a, 25b and 25c. A similar connection is provided between storage locations III and IV of the memory devices and respective fixed contacts of read gates 26c and 26d. Each of the read gates additionally is shown with an unconnected, or isolated, fixed contact with which its movable contact normally is in engagement except when the read gates operate to read-out stored words from the memory devices. The read gates are controlled by suitable timing or gating pulses which are derived from a clock generator (not shown).

The movable contact of each of read gates 26a–26d is connected through an OR gate 27 to error correcting encoder 28 and, additionally, to an input of OR gate 29. For the purpose of the present invention, it is assumed that error correcting encoder 28 is a CRC encoder. The CRC encoder is adapted to generate an error correcting code word in response to each word supplied thereto from read gates 26a–26d. CRC encoder 28 thus may be a conventional encoding circuit for generating the particular error correcting code word expressed by equations (5)–(7) above. Since each word is supplied serially to CRC encoder 28, it is appreciated that this encoder serially generates an error correcting code word associated with the particular data or parity word supplied thereto by the read gates. The output of CRC encoder 28 is coupled to another input of OR gate 29, and the output of this OR gate is connected to output terminal 30.

The manner in which the encoder shown in FIG. 4 operates now will be described with reference to the representation shown in FIGS. 5A–5G and 6A–6C. Let it be assumed that successive left-channel words and successive right-channel words are serially supplied to inputs 21L and 21R, as shown in FIG. 5A. Thus, words $L_1, L_2, \ldots L_{105}$ are supplied to input 21L and words $R_1, R_2, \ldots R_{105}$ are supplied to input 21R. Each left-channel and right-channel word is assumed to be comprised of sixteen serially transmitted bits. These bits are supplied to multiplexer 22 by parallel-to-serial converters 7L and 7R (FIG. 3), respectively.

At the time that words $L_1$ and $R_1$ are applied to multiplexer 22, these words are serially transmitted to the upper and lower outputs of the multiplexer, as shown in FIG. 4. At the time that the next words $L_2$ and $R_2$ are supplied to the multiplexer, word $R_2$ is transmitted to the upper output of the multiplexer and word $L_2$ is transmitted to the lower output thereof. When the next following words $L_3$ and $R_3$ are supplied to multpilexer 22, the multiplexer operates to transmit word $L_3$ to its upper output and word $R_3$ to its lower output. This alternate switching of the left-channel and right-channel words to the upper and lower outputs of multiplexer 22 results in alternating odd left-channel words and even right-channel words at the upper output and alternating odd right-channel words and even left-channel words at the lower output. For a reason soon to be explained, the upper output of multiplexer 22 is designated $A^1$ and the lower output of multiplexer 22 is designated $A^2$. Thus, the alternating words which are provided at output $A^1$ appear as $L_1R_2L_3\ldots R_{104}L_{105}$; while the alternating words at output $A^2$ appear as $R_1L_2R_3\ldots L_{104}R_{105}$, as shown in FIG. 5B.

Exclusive-OR gate 23 receives each bit from outputs $A^1$ and $A^2$. A parity-check operation is performed by the exclusive-OR gate in accordance with equation (4) above. Hence, exclusive-OR gate 23 generates parity words $p_1p_2\ldots p_{104}p_{105}$ in response to the words $L_1R_1, R_2L_2, \ldots R_{104}L_{104}$, and $L_{105}R_{105}$ which are provided at outputs $A^1$ and $A^2$. Each bit in a parity word p is produced in accordance with equation (4) above. Hence, there is a bit-by-bit parity check for each bit in the words produced at the outputs of multiplexer 22.

The alternating left-channel and right-channel words which are produced by multiplexer 22 are grouped in combinations of three. That is, at output $A^1$, words $L_1R_2L_3$ constitute one group. The next group of serially-transmitted words is constituted by words $R_4L_5R_6$. Similarly, the first group of words at output $A_2$ is constituted by words $R_1L_2R_3$. The next group of words at output $A^2$ is formed of words $L_4R_5L_6$. A similar grouping of parity words results in one group formed of words $p_1p_2p_3$, another group formed of words $p_4p_5p_6$, and so on. The first group of words is identified with a subscript 1, the second group of words is identified with a subscript 2, and so on. Thus, words $L_1R_2L_3$ at output $A^1$ may be identified as a character $A^1{}_1$. The next group of words $R_4L_5R_6$ at output $A^1$ may be identified as a character $A^1{}_2$. A similar identification of groups of words results in the last group $L_{103}R_{104}L_{105}$ being identified as character $A^1{}_{35}$. Similarly, the first group of parity bits is identified as character $P_1$, the second group of parity words is identified as character $P_2$, etc., and the last group of parity words is identified as character $P_{35}$. Finally, the group of words $R_1L_2R_3$ at output $A^2$ is identified as character $A^2{}_1$, the group of words $L_4R_5L_6$ at output $A^2$ is identified as character $A^2{}_2$, etc., and the last group of words $R_{103}L_{104}R_{105}$ at output $A^2$ is identified as character $A^2{}_{35}$.

With this arrangement of characters or words, it is seen that the left- and right-channel words, together with an associated parity word, is arranged in matrix form as a data block of the type shown in FIG. 2. That is, a first data block is formed of characters $A^1{}_1$, $P_1$ and $A^2{}_1$. Character $A^1{}_1$ is formed of a row of words $L_1R_2L_3$; character $P_1$ is formed of a row of parity words $p_1p_2p_3$; and character $A^2{}_1$ is formed of a row of words $R_1L_2R_3$. Thus, each data block is seen to be formed of three sub-blocks wherein data words (L and R) are separated from each other by a parity word (p). Each word is formed of a row of bits, and the bits of each row are aligned in respective columns.

Write gates 24a, 24b and 24c operate simultaneously to write characters $A^1{}_1, A^1{}_2, \ldots A^1{}_{35}$; characters $P_1, P_2, \ldots P_{35}$; and characters $A^2{}_1, A^2{}_2, \ldots A^2{}_{35}$ into storage locations I of memory devices 25a, 25b and 25c, respectively. Thus, storage location I of memory circuit 25a stores alternate channel words $L_1R_2\ldots R_{104}L_{105}$; storage location I of memory device 25b stores parity words $p_1p_2\ldots p_{104}p_{105}$; and storage location I of memory device 25c stores alternate channel words $R_1L_2\ldots L_{104}R_{105}$. As is appreciated, each storage location is selected to have sufficient capacity to store $16 \times 105 = 1680$ bits.

When storage location I of each memory device is filled with 105 words (or 35 characters), write gates 24a–24c are actuated to supply the next set of words or characters to storage location II in the memory devices. Then, when storage location II is filled, the write gates are actuated to supply the next following set of words or characters to storage location III. Thus, successive storage locations cyclically are addressed so as to have words or characters written therein by write gates 24a–24c. While one storage location in each memory device 25a–25c is supplied with words or characters written therein, a preceding storage location which already has been filled is read out by read gates 26a–26d. For example, while write gates 24a–24c supply words to storage location III in each memory device, the words previously stored in storage location I in each device are read out. If desired, each memory device may be reduced to have only three storage locations instead of the four locations illustrated in FIG. 4.

The words or characters stored in a storage location in a memory device are read out therefrom in serial fashion, and each read gate 26a–26d sequentially accesses a predetermined storage location in each memory device. For example, read gates 26a access storage location I in memory device 25a until all of the words or characters stored in storage location I are read out, and then storage location I in memory device 25b is accessed and then storage location I in memory device 25c is accessed. While read gates 26a read out the contents of the memory devices, the remaining gates 26d–26d are in a quiescent or idle condition. That is, the movable contact of these read gates each engages its isolated fixed contact. After read gates 26a access storage location I of memory device 25c, these read gates assume their quiescent condition and read gates 26b then operate to access storage locations II in each of memory devices 25a–25c, in sequence. After this operation of read gates 26b, read gates 26c are operative to access storage locations III in each of memory devices 25a–25c, in sequence. Then read gates 26d access storage locations IV in memory devices 25a, 25b and 25c, in sequence.

FIG. 5C represents the manner in which storage location I of memory device 25a is accessed. The read gates compress the time axis of the words or characters which are read out from the respective memory devices. That is, when read gates 26a access storage location I of memory device 25a, character $A^1_1$ is read out at a rate such that words $L_1R_2L_3$ are read out, followed by a time gap during which no words are read out. Then, the next character $A^1_2$ is read out whereby words $R_4L_5R_6$ are read out, followed by the time gap. This operation continues until character $A^1_{35}$ is read out from storage location I of memory device 25a. The time gap inserted between successive characters, or groups of words, is equal to a word interval of sixteen bits. Thus, successive groups of words, or successive characters, are separated from each other by a 16-bit interval.

Although not shown in FIG. 5, it should be appreciated that characters $P_1P_2$... formed of parity words are read out from storage location I of memory device 25b by read gates 26a in a manner analogous to that shown in FIG. 5C. That is, the set of parity words is read out of memory device 25b following the reading out of the set of data words from memory device 25a. Once the set of parity words is read out from memory device 25b, the set of data words stored in storage location I of memory device 25c is read out therefrom by read gates 26a. That is, read gates 26a read out characters $A^2_1A^2_2$... with a compressed time axis of the type shown in FIG. 5C wherein successive characters are separated by a 16-bit interval.

As each character is read out by, for example, read gates 26a, the read-out character is transmitted serially to OR gate 29 and also to CRC encoder 28. At the completion of a character, CRC encoder 28 generates an error correcting code word, such as a CRC word, associated with the immediately preceding character. This CRC word is inserted into the gap which follows the character with which the CRC word is associated. Thus, the output of OR gate 29 is as shown in FIG. 5D wherein character $A^1_1$ is transmitted with left- and right-channel words $L_1R_2L_3$ followed by the CRC word which is inserted into the 16-bit interval following character $A^1_1$. Then, the next character $A^1_2$ is transmitted through OR gate 29, this character being followed by the CRC word associated therewith and which is inserted into the 16-bit interval following character $A^1_2$. This process continues so as to insert a CRC word into the 16-bit interval following each character.

In addition to compressing the time axis of the read-out characters for the purpose of inserting a CRC word, the time axis also is compressed for the purpose of inserting periodic horizontal synchronizing pulses. For example, after three characters, together with associated error correcting code words, are transmitted, a gap is formed prior to the transmission of the next set of three characters. This is achieved by delaying the reading out of the next set of three characters for a predetermined period of time, this additional delay being represented by the cross-hatched areas in FIG. 5C. These gaps which are formed between successive sets of three characters are present in the output of OR gate 29, as shown in FIG. 5D. Thus, output terminal 30 of the encoder shown in FIG. 4 is provided with alternating left-channel and right-channel words with a CRC word inserted after each three channel, or data words, and after three sets of words, a gap is present, as shown by the cross-hatched areas in FIG. 5D. It is seen that a total of twelve data and CRC words are transmitted between successive gaps, thus providing 192 bits in this interval.

The output of OR gate 29 (FIG. 5D) is supplied to mixing circuit 9 such that horizontal synchronizing pulses $H_D$ can be inserted into the gaps which are formed at successive 192-bit intervals. The output of mixing circuit 9 is shown in FIG. 5E. Thus, following a horizontal synchronizing signal $H_D$, mixing circuit 9 supplies three characters, together with associated CRC words, to input terminal 2i of VTR 1. Then, another horizontal synchronizing signal $H_D$ is provided, followed by another set of three characters and CRC words.

In view of FIGS. 5B-5E, it is appreciated that data blocks are recorded by VTR 1 in interleaved relation wherein first one row of each of thirty-five data blocks is recorded, followed by a parity row of each of the thirty-five data blocks, followed by another row of each of the thirty-five data blocks. Since three characters are recorded during each horizontal line interval, that is, one row from each of three data blocks is recorded during each horizontal line interval, it is appreciated that all of the characters which are stored in, for example, storage location I of memory device 25a occupy $35/3 = 11.7$ horizontal line intervals. All thirty-five blocks are recorded in $11.7 \times 3 = 35$ horizontal line intervals.

Referring to FIG. 6A, a typical video field is provided with a vertical synchronizing interval $V_D$ of 17.5 H (horizontal line intervals). Thus, the useful interval between successive vertical blanking intervals, and into which data can be inserted, is equal to 245 H. If thirty-five interleaved data blocks are recorded in an interval 35 H, then the total number of interleave units which can be recorded during a field interval is (245 H/35 H) = 7. That is, and with reference to memory devices 25a-25c, during a field interval, the characters stored in storage location I of memory devices 25a-25c can be recorded, followed by all of the characters in storage location II of the memory devices, followed by all of the characters in storage location III of all of the memory devices, followed by all of the characters in storage location IV of the memory devices, followed by the characters stored in storage locations I, II, III. This is represented by FIG. 6B.

Of course, no data is to be recorded by VTR 1 during the vertical blanking intervals $V_D$. This "no data" period is represented by the cross-hatched areas of FIG. 6C. Thus, during a vertical blanking interval, the movable contact of each of read gates 26a-26d is in engagement with the isolated, or non-connected contact. Thus, during the vertical blanking interval, no data is read out of the memory devices, and no data is recorded on the video recording medium.

At the completion of this "no data" period, read gates 26d are actuated to read-out sets or sections of characters from storage location IV of each of memory devices 25a, 25b and 25c, respectively, and successively. This is represented as the three sections "IV" shown in FIG. 6C. During each section, all thirty-five characters, or 105 words, are read out of storage location IV of the corresponding memory device. Of course, during this read-out operation, the read-out rate is such that gaps are formed between successive characters, as shown in FIG. 5C, and additional gaps are formed between groups of three characters, also as shown in FIG. 5C. As mentioned above, the error correcting code word associated with each character is inserted into the gap immediately following that associated character, and horizontal synchronizing signals $H_D$ are inserted into the additional gaps which are formed following each group of three characters, all as shown in FIGS. 5D and 5E.

As shown in FIG. 6C, following the reading out of characters from storage location IV in each of the memory devices, the characters which are stored in storage location I in each memory device are read out. Then the characters stored in storage location II are read out, followed by the characters stored in storage location III, followed by the characters stored in storage location IV. Therefore, it is seen that, during the period of 35 H, thirty-five blocks are read out in interleaved relation, and these interleaved blocks are recorded on the video recording medium. In the field interval of 245 H, seven different sets of interleaved blocks, each set being constituted by thirty-five interleaved blocks, are read out from the memory devices and are recorded on the recording medium.

FIG. 5F illustrates the reading out of successive sets of characters from a common storage location in each of the memory devices. FIG. 5F is aligned with FIG. 5E, except that the horizontal synchronizing signal $H_D$ is not shown in FIG. 5F. Thus, it is seen that the first set of characters $L_1R_2L_3$ CRC ... $L_{103}R_{104}L_{105}$ CRC is read out of memory device 25a and recorded on the video recording medium. This set of characters is followed by the next successive set of characters $P_1P_2P_3$ CRC ... $P_{103}P_{104}P_{105}$ CRC which is read out from memory device 25b and recorded on the recording medium. Then, the last set of characters $R_1L_2R_3$ CRC ... $R_{103}L_{104}R_{105}$ CRC is read out from memory device 25c and recorded on the recording medium. Although read out in seriatim, FIG. 5F shows successive rows of characters arranged in matrix form, wherein each character is formed of m+n (48+16) bits. It is appreciated that this arrangement of the serially read-out data, shown in FIG. 5F, is similar to the arrangement shown in FIG. 2. Accordingly, FIG. 5F can be redrawn as FIG. 5G, wherein each character A, P, A is formed of three groups of words plus the error correcting code word. That is, characters $A^1$ are formed of odd samples of the left-channel alternating with even samples of the right-channel, together with an associated error correcting code word; characters P are formed of parity words together with an associated error correcting code word; and characters $A^2$ are formed of odd samples of the right-channel which alternate with even samples of the left-channel, together with an associated error correcting code word. FIG. 5G is seen to be in direct correspondence with FIG. 2A wherein l=35.

Figure 7:
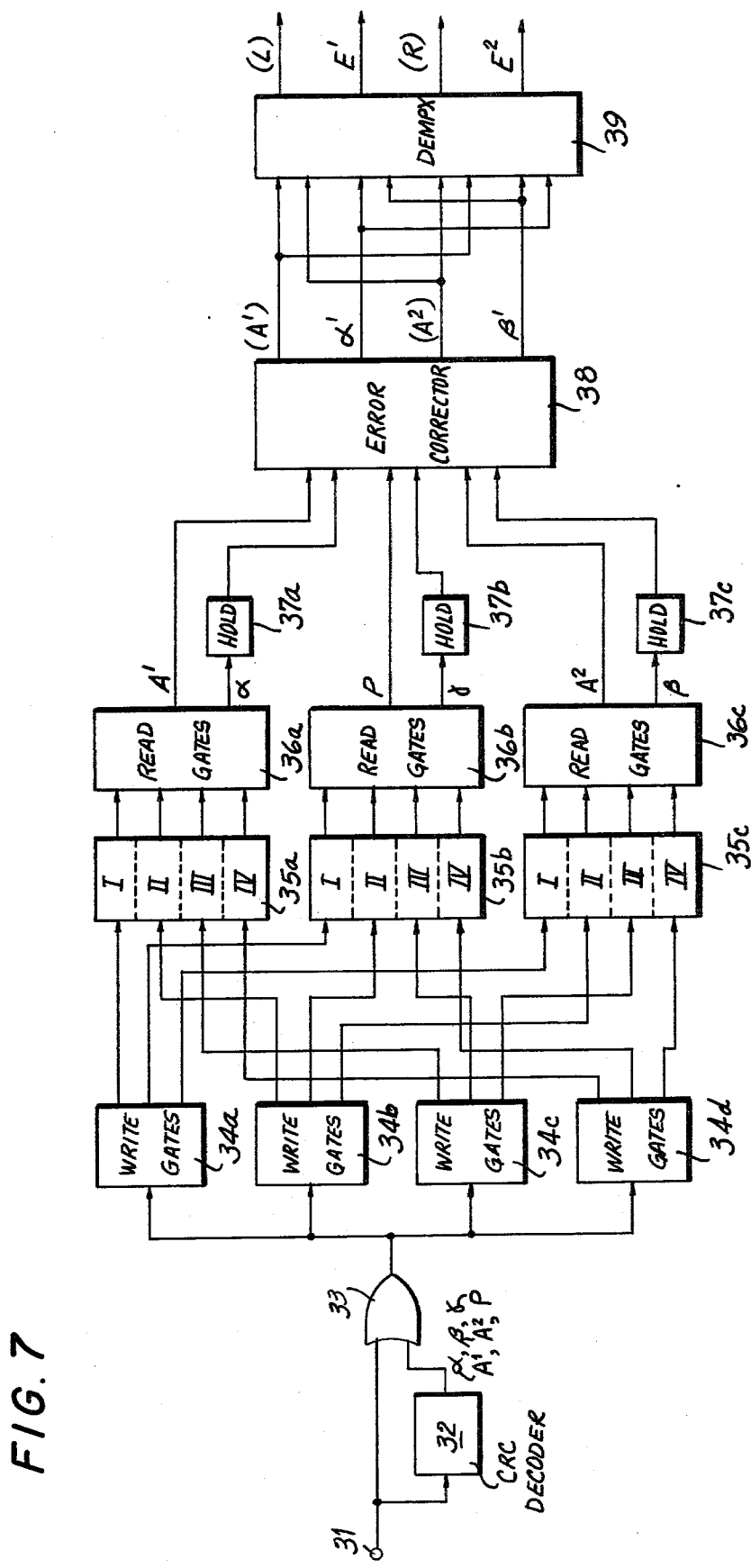
FIG. 7 is a block diagram of a data decoder in accordance with the present invention.

Referring now to FIG. 7, there is illustrated a block diagram of one embodiment of a decoder which can be used in the apparatus of FIG. 3 to decode and recover the stereo signals which are received thereby in the form shown in FIGS. 5C, 5D and 5E. The decoder includes an error correcting code word decoder, such as a CRC decoder 32, write gates 34a–34d, memory devices 35a–35c, read gates 36a–36c, an error corrector 38 and a demultiplixer 39. An input terminal 31 is adapted to receive the interleaved data blocks which are reproduced by VTR 1 and which are in the form shown in FIGS. 5C–5E. This input terminal is coupled to CRC decoder 32 and, additionally, to one input of an OR gate 33, the other input of which is coupled to the output of the CRC decoder.

CRC decoder 32 is adapted to detect each error correcting code word, such as the CRC word shown in FIG. 5E, and to provide an error indication whenever an error is detected. That is, if a character $A^1$, together with its associated CRC word is in error, as by a burst error, CRC decoder 32 provides an error indication thereof, this error indication being designated $\alpha$. Similarly, if an error is detected in a character $A^2$, together with its associated CRC word, decoder 32 is adapted to provide an indication $\beta$. Finally, if an error is detected in a parity character and its associated CRC word, then CRC decoder 32 provides an error indication $\gamma$. Thus, it is seen that an error indication $\alpha$ is associated with one or more of the left- and right-channel words L R included in character $A^1$, error indication $\beta$ is associated with an error in one or more left- and right-channel words L R in character $A^2$, and error indication $\gamma$ is associated with one or more parity words p in a parity character. Error indications $\alpha$, $\beta$, and $\gamma$ each may be comprised of a single bit, such as a binary 1 when an error is detected, and a binary 0 when no error is detected.

OR gate 33 is adapted to receive the serially-reproduced interleaved data blocks, together with error indications $\alpha$, $\beta$ and $\gamma$, the latter being produced by CRC decoder 32. The output of OR gate 33 is coupled in common to write gates 34a–34d. Each of these write gates is adapted to function in an opposite manner as aforedescribed read gates 26a–26d. Accordingly, each of the write gates may be comprised of logical gating circuits under the control of suitable gating pulses derived from a clock generator network (not shown). Insofar as the function of the write gates is concerned, each of these write gates may be thought of as including a movable contact coupled to the output of OR gate 33 and a plurality of fixed contacts, three of which are coupled to a respective storage location in memory devices 35a–35c. Each of the write gates additionally may include an isolated or unconnected contact with which its movable contact is engaged when one of the other write gates is actuated. As will be described below, the write gates are actuated in sequence such that while one is writing characters and error indications into respective memory devices 35a–35c, the remaining write gates admit of their quiescent states.

Memory devices 35a–35c are similar to aforedescribed memory devices 25a–25c and, therefore, may comprise RAM devices. Each memory device is formed of four storage locations, identified as locations I, II, III and IV, respectively. Each storage location of a memory device is connected to a corresponding output, or fixed contact, of one of write gates 34a–34d. Thus, storage location I of each memory device is connected to a respective output of write gates 34a. Each storage location II in memory devices 35a–35c is connected to a respective output of write gates 34b. Similar connections are provided between storage locations III and IV of the memory devices and respective outputs of write gates 34c and 34d, respectively. Suitable address generators may be provided (not shown herein) so as to produce proper write-in addresses whereby successive characters appearing at the outputs of write gates 34a–34d can be written into appropriately addressed storage compartments.

The outputs of respective storage locations in each of memory devices 35a, 35b and 35c are connected to corresponding read gates 36a, 36b and 36c, respectively. The read gates are analogous to aforedescribed write gates 24a–24c (FIG. 4), and are adapted to function in an opposite manner whereby a character in a storage location in each memory device is read out simultaneously thereby. The read gates are formed of logical gating circuits under the control of a suitable timing signal generator (not shown). However, the read gates may be thought of as including a plurality of fixed contacts connected to respective storage location outputs of an associated memory device, and a movable contact selectively engageable with the fixed contacts, in sequence. In particular, read gates 36a, 36b and 36c are adapted to read out simultaneously a character from storage location I of memory device 35a, a character from storage location I of memory device 35b and a character from storage location I of memory device 35c, respectively. When all of the characters stored in a given storage location are read out therefrom, the read gates are actuated to access the next storage location, such as storage location II, in the memory devices.

Each of the read gates is provided with a data output at which a data character is serially read out from an associated memory device, and an error indication output whereat a respective error indication bit $\alpha$, $\beta$ or $\gamma$ is read out from the associated memory device. The secondary output of each of the read gates is connected to a hold, or temporary store circuit 37a, 37b and 37c, respectively. The error indication bit is adapted to be stored in the corresponding hold circuit for a duration of a character.

The main outputs of read gates 36a–36c, together with the outputs of hold circuits 37a–37c, are connected to error corrector 38. The error corrector is adapted to correct character $A^1$ in the event that error indication $\alpha$ represents an error in this character, or to correct character $A^2$ in the event that error indication $\beta$ represents an error in this character. The error correction is carried out on the basis of parity character P, as will be described further below. Thus, error corrector 38 is adapted to provide a corrected character $[A^1]$ and a corrected character $[A^2]$ at respective outputs thereof. In the event of a burst error wherein two or more characters $A^1$, $A^2$ or P are in error, as represented by error indications $\alpha$, $\beta$ and $\gamma$, additional error indications $\alpha'$, and $\beta'$ are provided at corresponding outputs of the error corrector. That is, if two or more error indications $\alpha$, $\beta$ and $\gamma$ are represented as a binary 1, then one or the other of further error indications $\alpha'$ and $\beta'$ are represented as a binary 1, as will be described below. As will be appreciated, an error correction based upon parity character P cannot be carried out if any two of characters $A^1$, $A^2$ and P are in error.

The respective outputs of error corrector 38 are coupled to demultiplexer 39. The demultiplexer is adapted to demultiplex the alternating left-channel and right-channel words so as to restore the original left-channel words and right-channel words on separate outputs. That is, demultiplexer 39 is adapted to reconvert the alternating arrangement shown in FIG. 5B back to the original arrangement shown in FIG. 5A. Demultiplexer 39 thus is provided with outputs [L] and [R], corresponding to corrected left-channel words and right-channel words, respectively. The demultiplexer additionally is provided with error indication outputs $E^1$ and $E^2$ associated with the left- and right-channel outputs [L] and [R], respectively. The purpose of these error indication outputs is to represent when left-channel and right-channel words cannot be corrected. The presence of error indications on error indication outputs $E^1$ and $E^2$ is used to actuate interpolation circuits 13L and 13R, respectively, so as to provide substitutions for the erroneous word, such substitutions being based upon averaging or interpolation techniques.

In operation, let it be assumed that interleaved data blocks having horizontal synchronizing signals $H_D$ and error correcting code words CRC, such as shown in FIG. 5E, are reproduced by VTR 1. Synchronizing signal separator circuit 11 effectively removes the horizontal synchronizing signals from the interleaved data blocks, resulting in gaps which recur at the beginning and end of each horizontal line interval. These gaps are shown by the cross-hatched areas in FIG. 5D. The serially transmitted interleaved data blocks of the type shown in FIG. 5D are applied to input terminal 31. Let it be assumed that write gates 34a are actuated while write gates 34b–34d are in their quiescent states. Hence, character $A^1_1$ formed of alternating words $L_1R_2L_3$ are written into storage location I of memory device 35a. The CRC code which follows words $L_3$ at the end of character $A^1_1$ is decoded by CRC decoder 32 to produce an error indication $\alpha$. This error indication either is a binary 1, representing the presence of an error in character $A^1_1$, or is a binary 0 representing the absence of an error. In any event, error indication $\alpha$ also is written into storage location of memory device 35a.

Upon the occurrence of the next character $A^1_2$, the foregoing operation is repeated and left-channel and right-channel words which constitute the data of character $A^1_2$ are written into storage location I of memory device 35a. In addition, error indication $\alpha$ also is written into this storage location. This operation is repeated until the last character $A^1_{35}$ in this set or section of the interleaved data blocks is received, and the alternating left-channel and right-channel words are written into storage location I of memory device 35a.

Although not shown herein, it may be appreciated that the timing pulses which are used to write the characters into the memory devices are synchronized with the reproduced horizontal synchronizing signals so as to account for, and thus cancel, time-base errors which may be present in the reproduced data. Hence, jitter and other phase distortion is avoided.

After character $A^1_{35}$ is written into storage location I of memory device 35a, the set of parity characters is reproduced. Thus, parity character $P_1$ formed of parity words $p_1p_2p_3$ is written into storage location I of memory device 35b. When the CRC word following parity word $p_3$ occurs, CRC decoder 32 produces a corresponding error indication $\gamma$. This error indication also is stored in storage location I of memory device 35b. Upon the occurrence of the next parity character $P_2$ formed of parity words $p_4p_5p_6$, the foregoing operation is repeated so as to write character $P_2$ into storage location I of memory device 35b. The CRC word which follows parity word $p_6$ is decoded by CRC decoder 32, and a corresponding error indication $\gamma$ is stored in the storage location I of memory device 35b. The foregoing operation is repeated until parity character $P_{35}$ formed of parity $p_{103}p_{104}p_{105}$ is written into storage location I, together with the associated error indication $\gamma$, of memory device 35b.

After parity character $P_{35}$ is written into memory device 35b, the next set or section of the interleaved data blocks is provided at input terminal 31. This set of characters is formed of characters $A^2_1 \ldots A^2_{35}$. Write gates 34a are actuated to write character $A^2_1$ formed of words $R_1L_2R_3$ into storage location I. When the CRC word associated with this character is supplied to input terminal 31, this CRC word is decoded by decoder 32 to produce a corresponding error indication $\beta$. Error indication $\beta$ is written into storage location I by write gates 34a. Upon the occurrence of the next character $A^2{}_2$ formed of words $L_4R_5L_6$, this character is written into storage location I of memory device 35c. The CRC word associated with character $A^2{}_2$ is decoded by CRC decoder 32, and the corresponding error indication $\beta$ also is stored in storage location I. The foregoing operation is repeated until the last character $A^2{}_{35}$, together with its associated error indication $\beta$, is written into storage location I of memory device 35c. Upon the occurrence of the next character, write gates 34a are deactuated to their quiescent state and write gates 34b are actuated so as to write characters $A^1{}_1 \ldots A^1{}_{35}$, together with associated error indications $\alpha$, into storage location II of memory device 35a; to write parity characters $P_1 \ldots P_{35}$, together with associated error indications $\gamma$, into storage locations II of memory device 35b; and to write characters $A^2{}_1 \ldots A^2{}_{35}$, together with associated error indications $\beta$, into storage location II of memory device 35c. Thus, a given storage location in each of memory devices 35a–35c is accessed, in sequence, by associated write gates 34a–34d. In this manner, the interleaved data blocks are written into memory devices 35a, 35b and 35c. With respect to storage location I of these memory devices, the characters stored therein have the matrix format shown in FIG. 5G. Thus, a character in storage location I of memory device 35a, together with a character in storage location I of memory device 35b and a character in storage location I of memory device 35c cumulatively constitute a data block. A similar format of data blocks is adapted to be stored in the remaining storage locations of the memory devices.

During read-out, a character in storage location I in each of memory devices 35a–35c is read out simultaneously by read gates 36a–36c. It may be appreciated that the rates at which characters are written into and read out of each memory device are such as to fill in the gaps previously formed by the removal of horizontal synchronizing signals $H_D$ and CRC words from the received interleaved data blocks. That is, read gates 36a–36c function to expand the time axis of the read out characters.

Read gates 36a–36c operate simultaneously to read out character $A^1{}_1$ from storage location I of memory device 35a, character $P_1$ from storage location I of memory device 35b, and character $A^2{}_1$ from storage location I of memory device 35c, respectively. In addition, error indications $\alpha$, $\beta$ and $\gamma$, which are associated with characters $A^1{}_1$, $A^2{}_1$ and $P_1$, respectively, also are read out of the memory devices. Error indications $\alpha$, $\beta$ and $\gamma$ may be stored at particular storage compartments such that they are read out at the beginning of a character. These error indications are temporarily stored for the duration of a character in hold circuits 37a, 37b and 37c. Accordingly, the read gates are operative to read out sequential data blocks, and associated error indications, from memory devices 35a–35c such that the data block format shown in FIG. 5G is read out.

It is recognized that when a data block is read out of the memory devices by read gates 36a–36c, error corrector 38 is supplied with the read-out data block which may appear as shown in FIG. 5D. That is, left-channel word $L_1$, right-channel word $R_1$ and parity word $p_1$ are simultaneously supplied, serial-by-bit, to the error corrector. Then, right-channel word $R_2$, left-channel word $L_2$ and parity word $p_2$ are supplied simultaneously, serial-by-bit; followed by left-channel word $L_3$, right-channel word $R_3$ and parity word $p_3$. Of course, error indications $\alpha$, $\beta$ and $\gamma$ also are supplied to error corrector 38 at the time that the respective left-channel, right-channel and parity words are supplied thereto.

The manner in which error corrector 38 corrects an erroneous left-channel word or right-channel word in a character now will be described. Let it be assumed that error indication $\alpha$ is a binary 1. This means that character $A^1{}_1$ is in error. If error indications $\beta$ and $\gamma$ each are a binary 0, then the error in character $A^1{}_1$ can be corrected on the basis of parity words $p_1p_2p_3$. Thus, character $A^2{}_1$ is combined with parity character $P_1$ to provide a corrected version of character $A^1{}_1$. If error indication $\beta$ is a binary 1, representing that character $A^2{}_1$ is in error, this erroneous character can be corrected on the basis of parity character $P_1$ by combining parity character $P_1$ with character $A^1{}_1$ in an exclusive-OR gate.

If a character which is read out of memory device 35a by read gates 36a is represented as $A^1$, a character which is read out of memory device 35c by read gates 36c is represented as $A^2$, then error corrector 38 is adapted to correct an erroneous character $A^1$ or an erroneous character $A^2$ on the basis of parity character $P$ and error indications $\alpha$, $\beta$ and $\gamma$. Corrected character $A^1$ is represented as $[A^1]$ and corrected character $A^2$ is represented as $[A^2]$. Accordingly, error corrector 38 functions to correct either character $A^1$ or character $A^2$ in accordance with the following Table I:

| $\alpha$ | $\Gamma$ | $\beta$ | $[A^1]$ | $[A^2]$ | $\alpha'$ | $\beta'$ |
| --- | --- | --- | --- | --- | --- | --- |
| 0 | 0 | 0 | | | | |
| | | | $A^1$ | $A^2$ | | |
| 0 | 1 | 0 | | | 0 | 0 |
| 1 | 0 | 0 | $P \oplus A^2$ | $A^2$ | | |
| 0 | 0 | 1 | $A^1$ | $P \oplus A^1$ | | |

It is seen from the foregoing table that character $A^1$ is corrected only if error indication $\alpha$ is a binary 1 and character $A^2$ is corrected only if error indication $\beta$ is a binary 1. If error indication $\gamma$ is a binary 1, representing an error in the parity character P, but error indications $\alpha$ and $\beta$ each are a binary 0, then there is no error in characters $A^1$ or $A^2$, thus requiring no error correction therein. Hence, if no error correction is required, the corrected character $[A^1]$ or $[A^2]$ is equal to the character $A^1$ or $A^2$ which is read out from read gates 36a and 36c, respectively.

As shown in Table I, further error indications $\alpha'$ and $\beta'$ which are produced by error corrector 38 each are a binary 0 if only one error indication $\alpha$, $\beta$ or $\gamma$ is a binary 1. If more than one character is in error, then one or the other or both of further error indications $\alpha'$ and $\beta'$ will be a binary 1. For example, if error indication $\alpha$ is a binary 1 and error indication $\gamma$ is a binary 1, then further error indication $\alpha'$ is a binary 1. Furthermore, in this condition, since character $A^1$ and parity character P both are erroneous, it is not possible to correct $A^1$ by combining parity character P with character $A^2$ in an exclusive-OR gate, as described above. Similarly, if error indication $\beta$ is a binary 1 and error indication $\gamma$ is a binary 1, then both character $A^2$ and the parity character P are in error, thereby preventing character $A^2$ from being corrected by using the parity character. The foregoing explanation is represented in the following Table II:

| α | Γ | β | [A¹] | [A²] | α' | β' |
|---|---|---|------|------|----|----|
| 1 | 1 | 0 | correction not possible | $A^2$ | 1 | 0 |
| 0 | 1 | 1 | $A^1$ | correction not possible | 0 | 1 |
| 1 | 0 | 1 | correction not possible | correction not possible | 1 | 1 |
| 1 | 1 | 1 | correction not possible | correction not possible | 1 | 1 |

As seen from Table II, if error indication α is a binary 1, then further error indication α' also is a binary 1 if one or the other of error indications β and γ is a binary 1. Similarly, if error indication β is a binary 1, then further indication β' is a binary 1 if either of error indications α or γ is a binary 1. In the last row of Table II, since each of error indications α, β and γ is a binary 1, further error indications α' and β' also are binary 1's.

The operation of error corrector 38, as represented by Tables I and II, may be expressed by the following logic equations:

$$[A^1] = A^1 \cdot \bar{\alpha} + (P \oplus A^2) \cdot \alpha \cdot \bar{\beta} \cdot \bar{\gamma} \qquad (9)$$

$$[A^2] = A^2 \cdot \bar{\beta} + (P \oplus A^1) \cdot \bar{\beta} \cdot \alpha \cdot \bar{\gamma} \qquad (10)$$

$$\alpha' = \alpha(\beta \cdot \bar{\gamma} + \gamma) \qquad (11)$$

$$\beta' = \beta(\alpha \cdot \bar{\gamma} + \gamma) \qquad (12)$$

It is appreciated that one of ordinary skill in the art would be readily enabled to implement the foregoing logic equations with conventional logic circuitry.

The respective characters [A¹] and [A²], together with further error indications α' and β', as expressed in the foregoing logic equations and as represented by Tables I and II, are supplied to demultiplexer 39. As mentioned above, demultiplexer 39 functions to demultiplex the alternate left-channel and right-channel words, shown in FIG. 5B, which had been multiplexed by multiplexer 22. Accordingly, demultiplexer 39 is provided with a left-channel output [L] and with a right-channel output [R]. Error control signals E¹ and E² also are produced by demultiplexer 39.

Let it be assumed that the corrected characters which are supplied simultaneously to the demultiplexer are represented as [A¹₁] and [A²₁], as shown in FIG. 5B. The respective words L₁ and R₁ are supplied to outputs [L] and [R] to provide corrected left-channel and right-channel words. At the next word, right-channel word R₂, included in character [A¹₁] is supplied to output terminal [R] while left-channel word L₂, included in corrected character [A²₁] is supplied, or distributed, to output terminal [L]. Further distribution of the respective left-channel and right-channel words results in transmitting all of the left-channel words to output terminal [L] and all of the right-channel words to output terminal [R]. It is assumed herein that the output terminals [L] and [R] are provided with corrected left-channel and right-channel words from error corrector 38. However, if further error indications α' or β' are a binary 1, then the associated left-channel or right-channel word cannot be corrected by the error corrector.

Let it be assumed that further error indication α' is a binary 1. Let it be further assumed that the corrected characters supplied to demultiplexer 39 are [A¹₁] and [A²₁]. Since α' is a binary 1, then left-channel word L₁ cannot be corrected. Hence, error control signal E¹ is, for example, a binary 1 at the time that left-channel word L₁ is distributed to output terminal [L]. However, at this time, the right-channel word R₁ is supplied to demultiplexer 39 without error, and error control signal E² is a binary 0. At the next word, right-channel word R₂, which is included in character A¹₁, is distributed to output terminal [R], and since further error indication α' is a binary 1, error control signal E² also is a binary 1. But, since left-channel word L₂ is correct, it is distributed to left-channel output L with error control signal E¹ as a binary 0. This operation continues for remaining characters [A¹] and [A²] which are supplied to demultiplexer 39, together with associated further error indications α' and β'. Hence, in addition to distributing the left-channel and right-channel words to output terminals [L] and [R], the demultiplexer also provides an error control signal E¹ or E² which is associated with a corresponding one of each word. If a corresponding left-channel word is in error, as determined by error corrector 38, then error control signal E¹ is a binary 1. If the left-channel word is correct, then the error control signal E¹ is a binary 0. Similarly, if the right-channel word is in error, as determined by error corrector 38, then error control signal E² is a binary 1. If no error is present in this right-channel word, then error control E² is a binary 0.

Successive left-channel words provided at output terminal [L], together with associated error control signals E¹, are supplied to interpolation circuit 13L from demultiplexer 39 (FIG. 3). Also, successive right-channel words which are provided at output terminal [R], together with associated error control signals E², are supplied to interpolation circuit 13R. If the associated error control signal is a binary 0, then it is assumed that the left-channel word (or right-channel word) is correct, and no averaging or interpolation operation is performed thereon. However, if the error control signal is a binary 1, then the interpolation circuit, for example, interpolation circuit 13L, discards the erroneous word, such as the erroneous left-channel word, and substitutes therefor an interpolated value based upon the preceding and next succeeding left-channel words. For instance, the average value of such preceding and immediately following left-channel words can be used in place of the discarded erroneous left-channel word. It is appreciated that the interpolation circuit can, therefore, be formed of a latching circuit, an adding circuit, and associated gating circuits.

By the present invention, the arrangement of interleaved data blocks substantially minimizes the possibility that the information represented by such data blocks will be fully distorted or obliterated. It is highly unlikely that a burst error will have a duration that exceeds l characters, i.e., 1×(m+n) bits. A burst error that distorts each character in one row of, for example, thirty-five data blocks nevertheless can be compensated by reason of the remaining parity characters and data characters which can be used in combination to reconstruct the distorted set of characters. That is, and with reference to FIG. 2, even if the first row of characters A¹₁ ... A¹ₗ is distorted, the row of parity characters P₁ ... Pₗ and the row of remaining data characters A²₁ ... A²ₗ can be combined to reconstruct characters A¹₁ ... A¹ₗ.

Even if a burst error extends for a duration of 2×l characters, i.e, 2×l(m+n) bits, which is extremely unlikely, the present invention nevertheless serves to permit intelligible reconstruction of the transmitted or recorded data. In this event, although the distorted data characters cannot be reproduced by combining the parity characters with the correct characters, nevertheless, an averaging or interpolation operation will provide a reasonable value for the distorted data. By separating two sets of data characters by a set of parity characters in the interleaved data blocks (FIG. 2B), it is highly unlikely that data characters in both sets will be distorted by burst error. That is, if characters $A^1_1 \ldots P_l$ are distorted, characters $A^2_1 \ldots A^2_l$ will be correct. Also, if characters $P_1 \ldots A^2_l$ are distorted, characters $A^1_1 \ldots A^1_l$ will be correct. This means that if the received interleaved data blocks are reconverted so as to be arranged as $A^1_1 A^2_1 A^1_2 A^2_2 \ldots$ so as to be in proper order, at worst, only every other character will be erroneous. This erroneous character can be replaced by the average value of its two adjacent correct characters.

Hence, when the present invention is applied to the environment of transmitting or recording digitally encoded left-channel and right-channel stereo signals, it is highly unlikely that one or the other of such channels will be fully obliterated. At worst, every other sample in a given channel will be distorted; but the distorted sample can be replaced by the average value of its two adjacent correct samples. Hence, the ultimately reproduced stereo signals will not suffer from highly fluctuating signal levels which would be caused by burst error. As a consequence thereof, the reproduced sounds are perceived as being natural.

As may now be recognized, the length l of a set of characters in the interleaved data blocks should be selected in accordance with the length of the highest expected burst error. This selection avoids distortion of more than, at most, two sets of interleaved characters. For example, if the greatest expected burst error length is $k \times (m+n)$ bits, then the total number l of data blocks which should be interleaved should be selected such that $2 \times l > k$. With reference to FIG. 2B, this would insure that at least one full set of data characters will remain undistorted. When the teachings of the invention are used to record digitally encoded signals by a VTR, the length $2 \times l \times (m+n)$ bits is equal to about 23 H; and there is only an extremely low probability that a burst error will exceed this length.

Although significant signal distortion would occur if a burst error is present only during the first and second sets of data characters in the interleaved data blocks, this is a highly unusual occurrence and is not expected. In fact, when a VTR is used to record digitally encoded signals, there is an extremely low probability that drop-outs or burst errors will occur successively, separated by only a short period. This seriously reduces the possibility of distorting only the first and third rows of data characters which are transmitted in interleaved fashion, of the type shown in FIG. 2B. Nevertheless, to avoid undesired sound distortion even for this unlikely occurrence, a muting circuit can be provided at, for example, output terminals 16L and 16R (FIG. 3), this muting circuit being responsive to further error indications α' and β' or error control signals $E^1$ and $E^2$ if all of these signals are a binary 1.

In the system shown in FIG. 3, it may be appreciated that the interleaved data blocks having horizontal and vertical synchronizing signals inserted therein, such as partially represented by FIG. 5E, are supplied to the usual frequency modulator included in VTR 1. Each bit thus is used to modulate the frequency modulator in accordance with the binary 1 or binary 0 value of that bit. Of course, during signal reproduction, the modulated FM signals are reproduced and are demodulated in order to recover the original bit signals.

While the present invention has been particularly shown and described with reference to a preferred embodiment thereof, it will be readily apparent to one of ordinary skill in the art that various changes and modifications in form and details can be made without departing from the spirit and scope of the invention. For example, the number of words in a character can be increased or reduced as desired. In FIG. 5F, each character is shown as being formed of four words, one of which words is an error correcting code word. The teachings of this invention are applicable to a character formed of only a single word, or formed of a data word in combination with an error correcting code word. Still further, each character may be constituted by more than four words. Also, the number of bits m in a data word, as well as the number of bits n in an error correcting code word can be any desired number. In the embodiment described herein, it is assumed that each left-channel and right-channel word is constituted by sixteen bits, three of such words together with a 16-bit error correcting code word constituting a data character. Other numbers of bits can be selected, as desired.

It is possible that the error correcting code words need not be transmitted only at the end of a character, such as shown in FIGS. 5D–5F. The error correcting code bits can be interleaved with the data bits, or the error correcting code word can be transmitted in preceding relation or in any other desired relation with respect to the data words. The CRC decoder (FIG. 7) can be properly timed so as to detect and decode the error correcting code bits, regardless of their particular position with respect to the data words.

In the embodiment shown and described with respect to FIGS. 3–7, the teachings of the present invention are shown as finding particular application for encoding, recording, reproducing and recovering left-channel and right-channel stereo signals. Of course, the present invention can be used to transmit or record multi-channel information. For example, and with respect to FIG. 5, each left-channel word and each right-channel word may represent two separate channels, such as left front, left back, right front and right back channels.

The use of a multiplexer, as described above, is advantageous in that, by its distribution of two-channel information to alternate paths or rows, the possibility of total distortion of both channels due to burst error is significantly reduced. However, if the particular transmission channel or recording medium is of the type wherein a large burst error is not a factor, this multiplexing technique can be avoided.

What is claimed is:

1. A method of transmitting encoded data words, each data word being formed of a multiple of bits, said method comprising the steps of generating a plurality of data blocks and a row of parity bits included in each data block, each data block including a plurality of rows of information bits, and a given parity bit being associated with corresponding ones of information bits in said rows of information bits in said block; generating respective error correcting codes associated with respective rows in each block; and serially transmitting each data block by transmitting said rows of information bits and associated error correcting codes and said row of parity bits and associated error correcting code such that said row of parity bits and associated error correcting code is preceded by a row of information bits and its associated error correcting code and is followed by a row of information bits and its associated error correcting code.

2. The method of claim 1 further comprising the step of storing each data block in matrix form prior to transmission thereof, wherein the information bits in each row are stored in respective columns and each parity bit in said row of parity bits is associated with a respective column of information bits and is stored in a corresponding column.

3. The method of claim 2 wherein said step of generating respective error correcting codes comprises serially reading out a given stored row in successive blocks; and deriving a respective error correcting code for each predetermined number of bits included in said read out row.

4. The method of claim 3 wherein said step of serially transmitting each data block comprises alternately transmitting said given read out row and said error correcting code derived in accordance with said read out row for all of said stored blocks; alternately transmitting the next read out row and the error correcting code derived in accordance with said next read out row for all of said stored blocks; and continuing the alternate transmission of the next following read out rows and the error correcting codes derived in accordance with said next following read out rows for all of said stored blocks until all of said rows have been transmitted.

5. A method of encoding and transmitting first and second channel information signals comprising the steps of sampling said first and second channel information signals; generating first and second plural bit channel words representing said sampled first and second channel information signals, respectively; alternately switching said first and second channel words, respectively, to a first output; alternately switching said second and first channel words, respectively, to a second output; generating a parity bit for respective bits in said first and second channel words so as to form parity words; storing in a first storage means a predetermined number of words switched to said first output; storing in a second storage means said predetermined number of words switched to said second output; storing in a third storage means said predetermined number of parity words; reading out groups of said words in succession from said first storage means until all of said words have been read out, followed by groups of said parity words from said third storage means, followed by groups of said words from said second storage means; generating an error correcting code word for each group of read-out words; and inserting each error correcting code word immediately following the group words associated therewith.

6. The method of claim 5 wherein each said step of storing words in a storage means comprises writing in said predetermined number of words into successive storage locations in said storage means; and wherein said step of reading out comprises reading out groups of words from one storage location in a storage means while a different storage location therein is supplied with words.

7. The method of claim 6 wherein each group of words comprises a portion of a data block, said data block being formed of a group of words in a respective storage location in said first storage means, together with said error correcting code word associated therewith, plus a group of parity words in a respective storage location in said third storage means, together with said error correcting code word associated therewith, plus a group of words in a respective storage location in said code word associated therewith; and wherein said step of reading out further comprises transmitting a predetermined number l of data blocks in successive, interleaved relation by first transmitting l groups of words from said first storage means, together with l inserted error correcting code words associated with said l groups of words, respectively, from said first storage means, followed by l groups of parity words from said third storage means, together with l inserted error correcting code words associated with said l groups of parity words, respectively, followed by l groups of words from said second storage means, together with l inserted error correcting code words associated with said l groups of words, respectively, from said second storage means.

8. The method of claim 7 wherein each of said words is formed of n bits, and wherein each group of words is formed of m bits.

9. The method of claim 7 further comprising the step of inserting a video horizontal synchronizing signal after a preset number of words has been transmitted.

10. The method of claim 9 further comprising the step of recording said successive, interleaved data blocks with said inserted horizontal synchronizing signals on a video recording medium.

11. The method of claim 7 wherein the effective length of l groups of words and l associated error correcting code words plus l groups of parity words and l associated error correcting code words is greater than an expected burst error which may distort $2 \times l$ groups of words.

12. A method of receiving interleaved blocks of data words, each block being formed of plural rows of characters including at least two information characters and a parity character, each said character further including an error correcting word associated therewith, said blocks being received as a first set of successive information characters, one from each block, followed by a set of successive parity characters, one from each block, followed by another set of successive information characters, one from each block, said method comprising the steps of decoding each error correcting word to ascertain the presence of an error in each received character; storing said respective sets of characters and, if present, an indication of an error, in corresponding storage means; simultaneously reading out all of the characters of a block from said corresponding storage means together with indications of the presence of errors in said characters; and correcting errors in an information character of a block in accordance with said indications.

13. The method of claim 12 further comprising the step of replacing an erroneous information character in a block with the average of that character in a preceding and following block in the event that errors in two characters of the same block are indicated.

14. The method of claim 13 wherein each character is formed of a plurality of words.

15. The method of claim 14 wherein each word is comprised of n bits such that each character includes $m+n$ bits, wherein m is equal to the total number of bits in plural information or parity words and n is equal to the total number of bits in said error correcting word.

16. A method of receiving encoded two-channel data in the form of interleaved data blocks, each data block being formed of a group of alternate first channel and second channel multi-bit data words, a group of alternate second channel and first channel multi-bit words, respectively, and a group of multi-bit parity words associated bit for bit with said groups of first channel and second channel words in said block, each data block further including an error correcting word associated with and following each group of words, said interleaved data blocks being transmitted as l data blocks with l groups of words from said data blocks being interleaved with each other and with l groups of parity words from said l data blocks separating successive l groups of data words, said method comprising the steps of detecting each error correcting word to provide an error indication for a word included in the group associated with said error correcting word; storing each l group of words in a respective storage means; simultaneously reading said group of alternate first channel and second channel data words, said group of alternate second channel and first channel data words and said group of parity words, all of a common data block, out of said respective storage means; correcting one or more data words in a group with said group of parity words when one or more data words in one group of a data block contain errors; detecting when data words in two groups of a data block contain errors; separating said corrected alternate first channel and second channel data words and said corrected second channel and first channel data words into separate, simultaneous first and second channel words; and replacing an erroneous data word in a channel with the average of the data words in that channel which precede and follow it in the event that errors are detected in data words in two groups of said data block.

17. The method of claim 16 wherein each word is formed of n bits and said group of words is formed of m bits.

18. The method of claim 17 further comprising the step of storing the error indication for a word included in a group in the respective storage means in which said group is stored.

19. The method of claim 18 wherein said encoded two-channel data is left and right channel stereo information, said group of alternate first channel and second channel words is formed of odd samples of left channel words and even samples of right channel words, and said group of alternate second channel and first channel words is formed of odd samples of right channel words and even samples of left channel words.

20. A system for transmitting encoded data, comprising:
a source of data blocks, each data block being formed of a matrix array including plural rows of data words, each data word being constituted by columns of bits, and a row of at least one parity word whose bits are associated with respective bit columns;
code generating means for generating a respective error correcting code word for each row of data words; and
transmitting means for transmitting in seriatim a first row of data words for all of said data blocks, followed by a row of parity words for all of said data blocks, followed by another row of data words for all of said data blocks.

21. The system of claim 20 wherein said source of data blocks comprises plural storage means each having plural storage compartments, each storage means being operative to store a respective row of data or parity words and each storage compartment being operative to store a predetermined number of words.

22. The system of claim 21 wherein each word is formed of m bits and each storage compartment stores l words; and wherein each error correcting code word is formed of n bits for an m-bit word.

23. The system of claim 21 wherein said source of data blocks further comprises first and second data word generators for generating a first row of data words in seriatim and a second row of data words in seriatim; first write gate means for writing a predetermined number of said data words in said first row into said storage compartments in first storage means in succession; second write gate means for writing said predetermined number of said data words in said second row into said storage compartments in second storage means in succession; parity word generating means for generating said parity words in seriatim in response to said first and second rows of data words; and third write gate means for writing said predetermined number of parity words into said storage compartments in third storage means in succession.

24. The system of claim 23 wherein said parity word generating means comprises exclusive-OR means for receiving successive bits of said first and second rows of data words for producing a parity bit in response thereto.

25. The system of claims 23 or 24 wherein said transmitting means comprises read gate means associated with said respective storage compartments of said first, second and third storage means, each of said read gate means being operative to read out in seriatim all of the data words in an associated storage compartment from successive storage means such that first and second rows of read out data words are separated by a row of read out parity words and successive read out words are spaced from each other by a gap.

26. The system of claim 25 wherein said code generating means is responsive to each read out word to generate said error correcting word; and said transmitting means further includes means for inserting each error correcting code word into the gap following a read out word.

27. The system of claim 20 further comprising a video signal recording medium; recording means for recording all of said words on said recording medium in seriatim; adding means coupled to said transmitting means for adding each error correcting code word to a transmitted data word; and means coupled between said adding means and said recording means for inserting a horizontal synchronizing signal following a predetermined number of words, such that said first row of data words together with error correcting code words and horizontal synchronizing signals, followed by a row of parity words together with error correcting code words and horizontal synchronizing signals, followed by said another row of data words together with error correcting code words and horizontal synchronizing signals all are recorded on said recording medium.

28. The system of claim 27 wherein said source of data blocks comprises a source of left channel stereo signals and a source of right channel stereo signals; multiplexing means for generating a first row of data words constituted by odd digital samples of said left channel signals alternating with even digital samples of said right channel signals and a second row of data words constituted by odd digital samples of said right channel signals alternating with even digital samples of said left channel signals, each data word being formed of a predetermined number of samples; parity word generating means for generating said parity words in response to said first and second rows of data words; and storage means for storing said first and second rows of data words and said parity words.

29. The system of claim 28 further comprising read-out means for reading out a preselected number of said data words in said first row followed by said preselected number of parity words followed by said preselected number of data words in said second row from said storage means at a read-out rate to form a gap between successive read-out words; and wherein said adding means inserts an associated error correcting code word into each gap.

30. A system comprising: a source of left channel stereo signals and a source of right channel stereo signals; multiplexing means for generating a first row of data words constituted by odd digital samples of said left channel signals alternating with even digital samples of said right channel signals and a second row of data words constituted by odd digital samples of said right channel signals alternating with even digital samples of said left channel signals, each data word being formed of a predetermined number of samples; parity word generating means for generating parity words in response to said first and second rows of data words; first storage means for storing said first and second rows of data words and said parity words; read-out means for reading out a preselected number of said data words in said first row followed by said preselected number of parity words followed by said preselected number of data words in said second row from said storage means at a read-out rate to form a gap between successive read-out words; code generating means for generating a respective error correcting code word for each data and parity word read out from said storage means and for inserting each error correcting code word into a respective gap; means coupled to said code generating means for inserting a horizontal synchronizing signal following a predetermined number of data and parity words; a video signal recording medium; recording means for recording said data and parity words on said recording medium in seriatim, such that said first row of data words together with error correcting code words and horizontal synchronizing signals, followed by said second row of parity words together with error correcting code words and horizontal synchronizing signals, followed by said second row of data words together with error correcting code words and horizontal synchronizing signals are recorded on said record medium; reproducing means for reproducing a first row of said data words and associated error correcting code words, followed by a row of said parity words and associated error correcting code words, followed by a second row of said data words and associated error correcting code words from said recording medium; second storage means for storing said reproduced first row of data words, said reproduced row of parity words and said reproduced second row of data words; error decoding means for decoding said error correcting code words; read-out means for simultaneously reading out from said second storage means a data block formed of a data word in said first row, a data word in said second row and a parity word; error correcting means for correcting the read-out data word in said first row or in said second row in accordance with the decoded error correcting code words; and means for recovering said left channel and right channel stereo signals from said corrected data words.

31. A system for receiving encoded data which is transmitted as a predetermined number l of interleaved data blocks, each data block being formed of at least two rows of data words and associated error correcting code words and a row of parity words and an associated error correcting code word, said interleaved data blocks being constituted by l data and associated error correcting code words in said first rows followed by l parity and associated error correcting code words and followed by l data and associated error correcting code words in said second rows, all in seriatim, said system comprising receiving means for receiving said l interleaved data blocks; storage means for storing said l data words in said first rows, said l parity words and said l data words in said second rows; error detecting means for detecting each error correcting code word; read-out means for reading out successive data blocks from said storage means by reading out a first row data word, a parity word and a second row data word simultaneously from said storage means; and error correcting means for selectively correcting one or the other data word read out from said storage means as a function of said read-out parity word and the detected error correcting code words associated with said read-out words.

32. The system of claim 31 wherein the length of said l data and associated error correcting code words plus said l parity and associated error correcting code words is greater than the longest expected error length.

33. The system of claim 32 wherein said storage means comprises first memory means for storing said l data words in said first row; second memory means for storing said l data words in said second row; and third memory means for storing said parity words; and further comprising write gate means for receiving said interleaved data blocks to write said l data words in said first row into said first memory means, said l data words in said second row into said second memory means and said l parity words into said third storage means.

34. The system of claim 33 wherein each of said memory means includes plural compartments each for storing l data words in a respective row in successive interleaved data blocks.

35. The system of claim 33 wherein said error detecting means generates a first error indication when an error is detected in a data word in said first row, a second error indication when an error is detected in a data word in said second row, and a third-error indication when an error is detected in a parity word; and wherein said first memory means additionally stores each first error indication, said second memory means additionally stores each second error indication, and said third memory means additionally stores each third error indication.

36. The system of claim 35 wherein said read-out means comprises first, second and third read-out gates coupled to said first, second and third memory means, respectively, for simultaneously reading out a data word and an error indication from all of said memory means.

37. The system of claim 36 wherein said error correcting means comprises means coupled to said read-out gates and responsive to said first or second error indications for correcting the data word read out of said first or second memory means with said read-out parity word and said data word read out of said second or first memory means, respectively.

38. The system of claim 37 wherein said error correcting means further comprises averaging means responsive to said first error indication and one other error indication for replacing the data word read out of said first memory means with the average of the preceding and next following data words read out of said first memory means, said averaging means being additionally responsive to said second error indication and one other error indication for replacing the data word read out of said second memory means with the average of the preceding and next following data words read out of said second memory means.

39. The system of claim 36 wherein each data word is comprised of plural multi-bit samples of left and right channel stereo signals.

40. The system of claim 39 wherein each data word read out of said first and second memory means is formed of interleaved samples of said left and right channel signals such that samples of left and right channel signals are read out simultaneously from said first and second memory means; and further comprising channel separating means for applying all of the successive samples of said left channel signals to a left channel output and for applying all of the successive samples of said right channel signals to a right channel output.

41. The system of claim 40 wherein said error correcting means comprises averaging means responsive to at least two error indications for replacing an erroneous sample of a left or right channel signal read out of said first or second memory means with the average of the preceding and next following sample of that channel.

42. The system of claim 36 wherein said write gate means are operative to write said data and parity words into said respective memory means whereby said associated error correcting code words are not written into said memory means, and said read-out gates are operative to read said data and parity words out of said respective memory means to expand the time axis thereof.

* * * * *